United States Patent Office 3,346,970
Patented Oct. 17, 1967

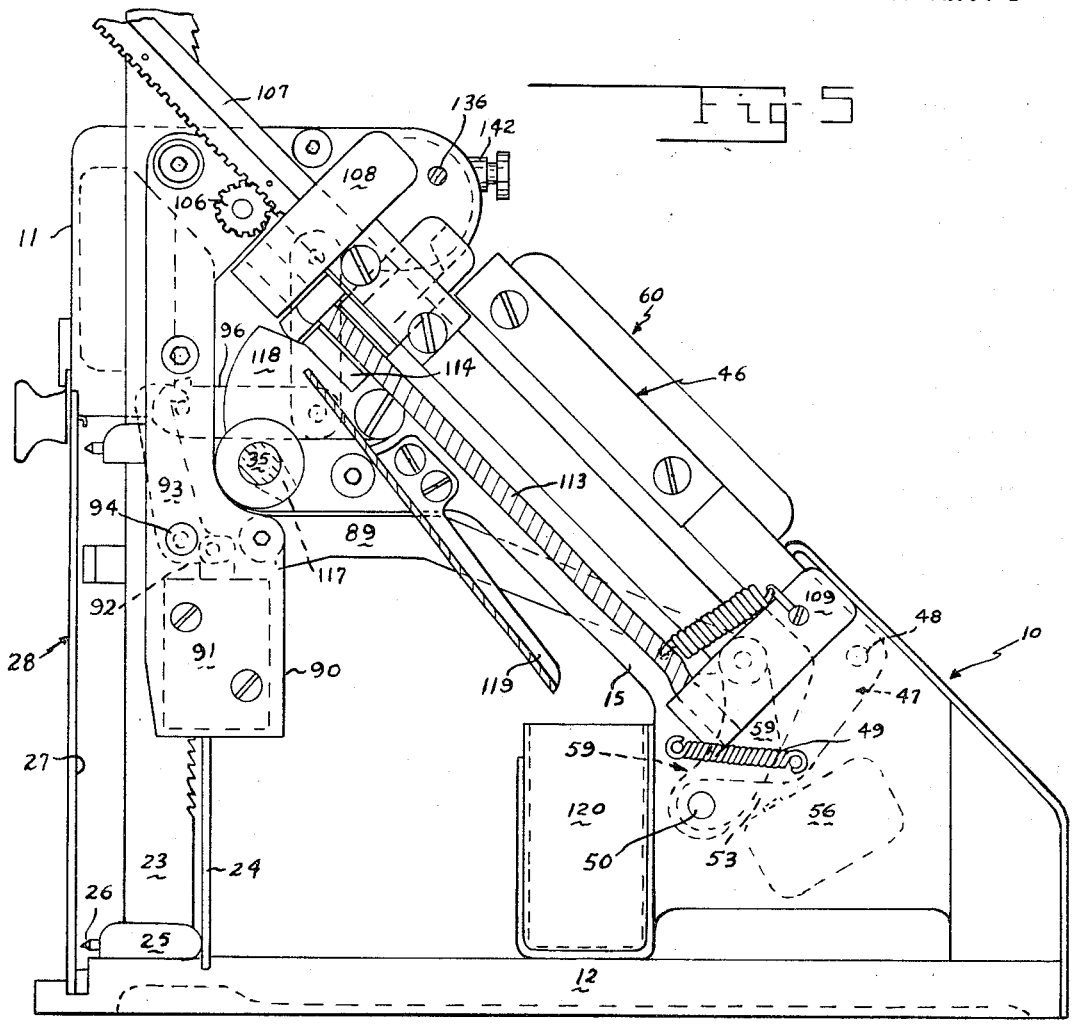
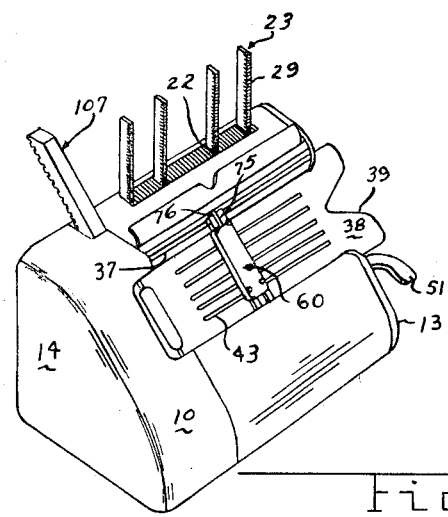

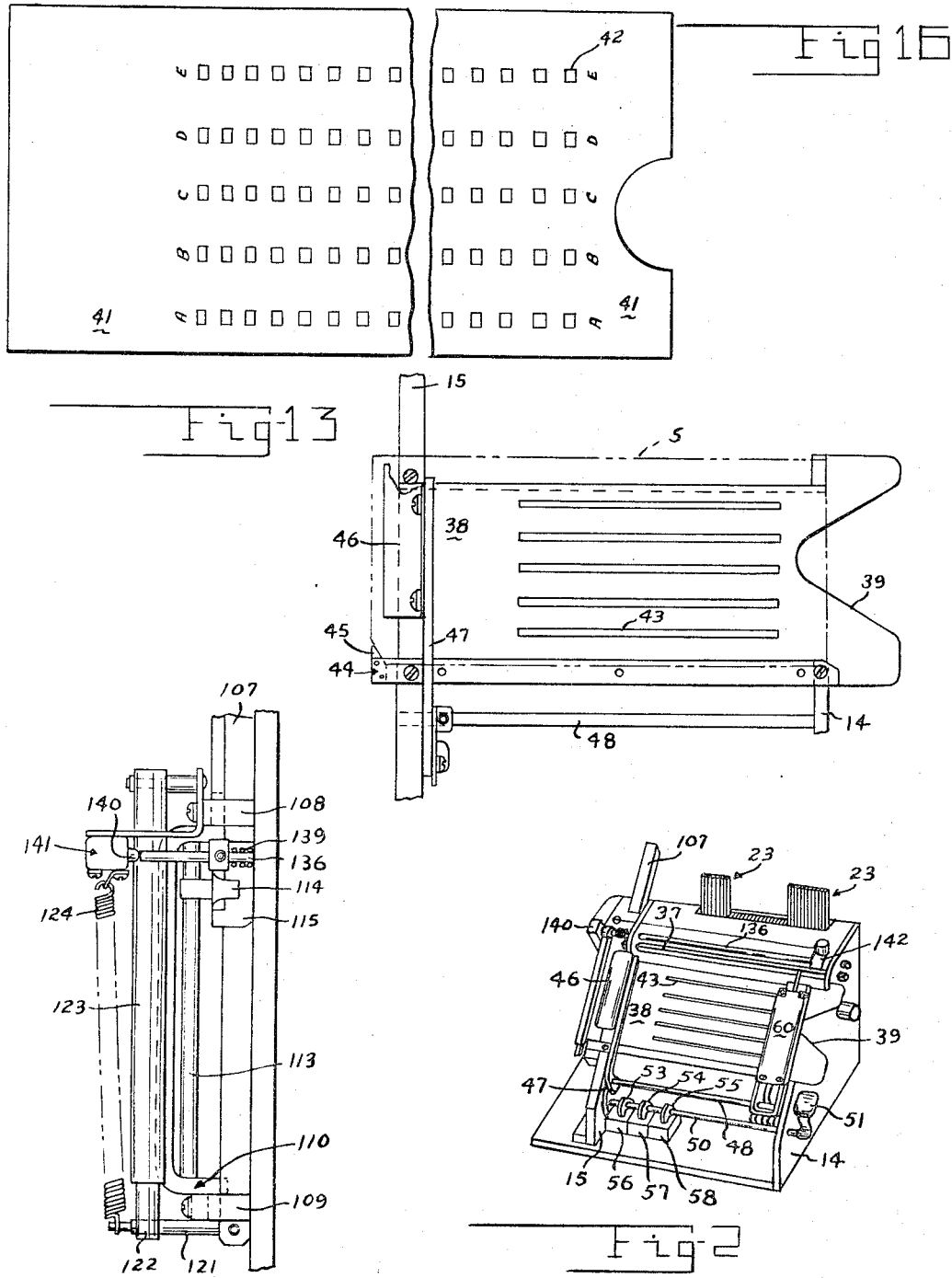

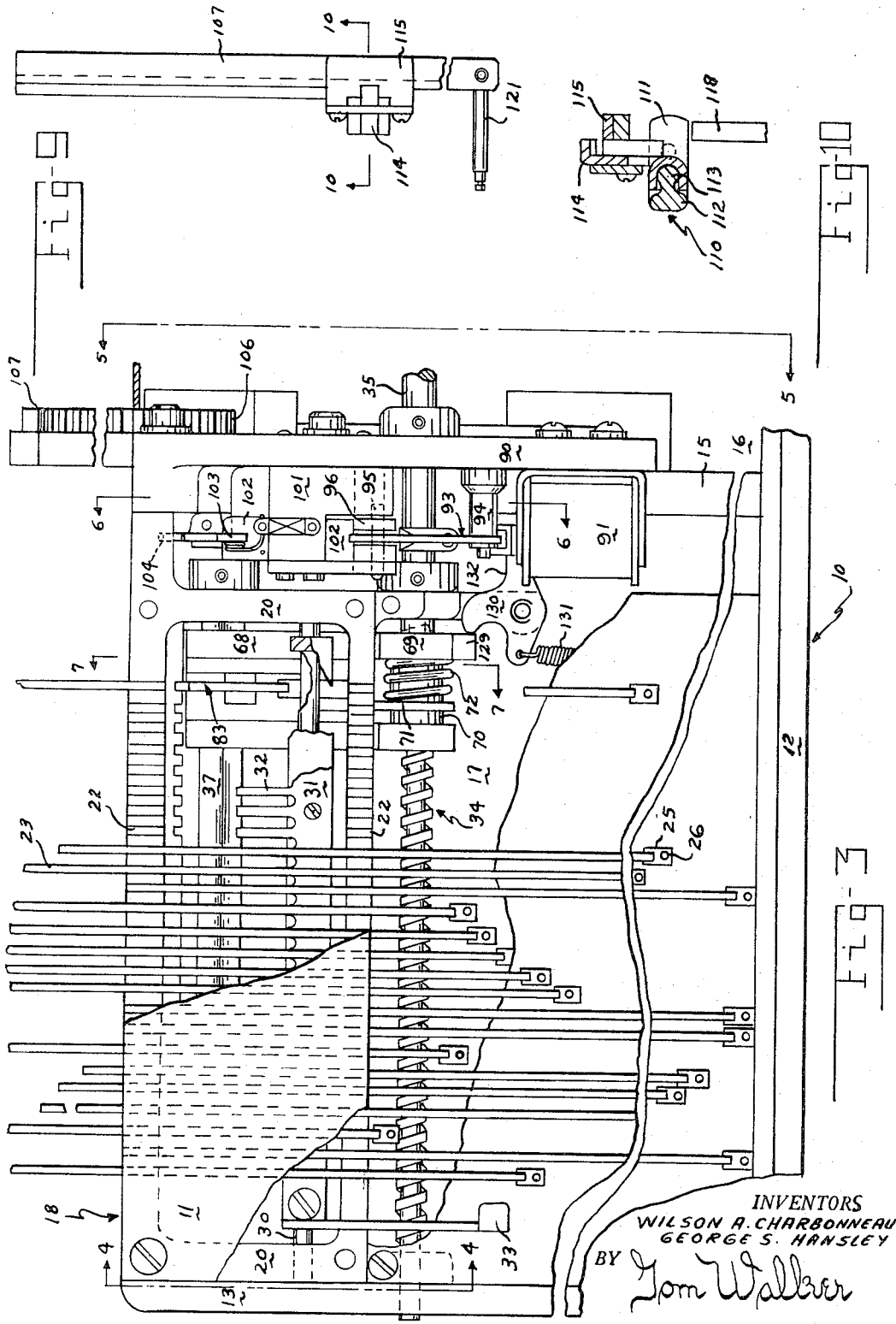

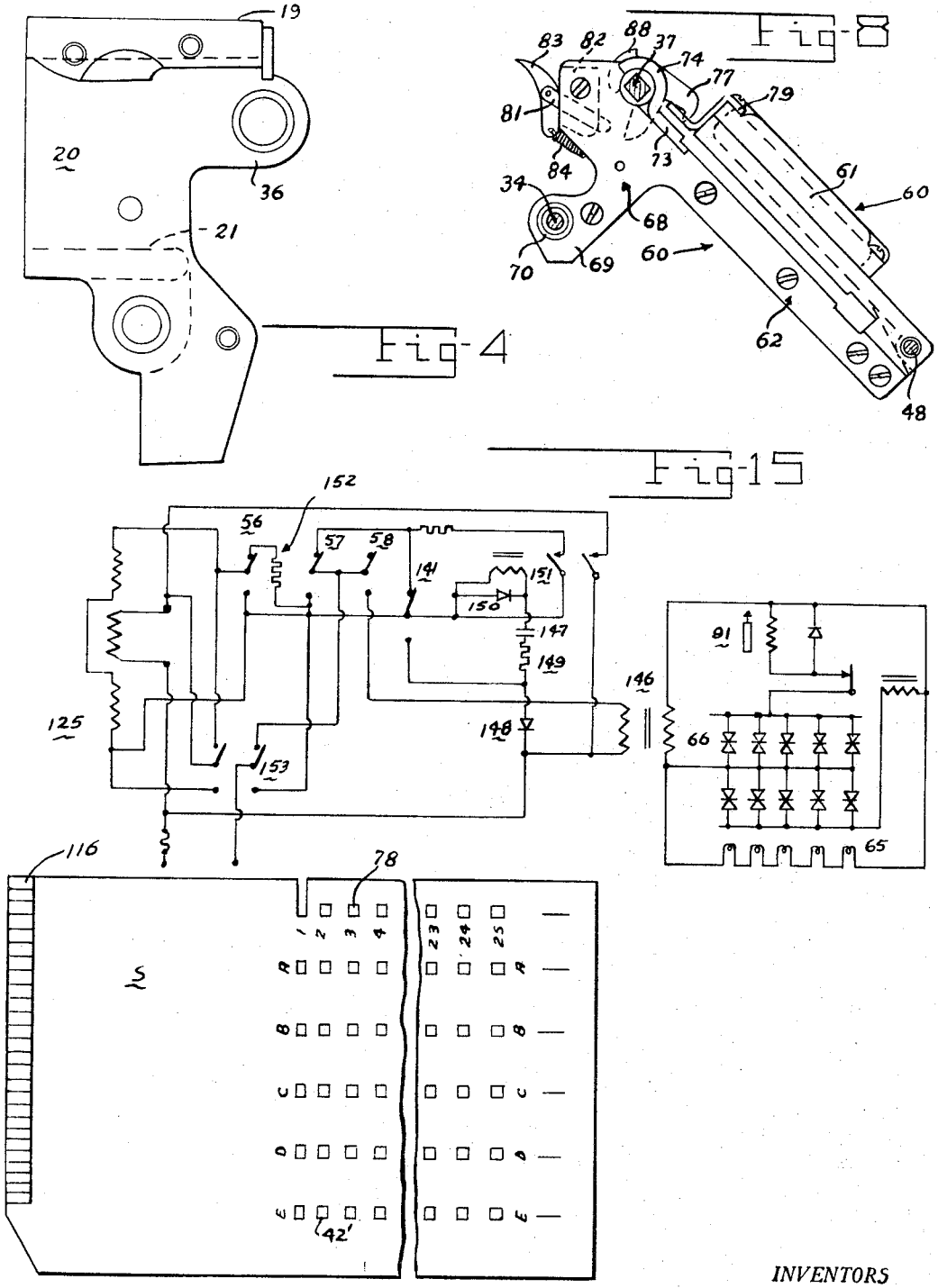

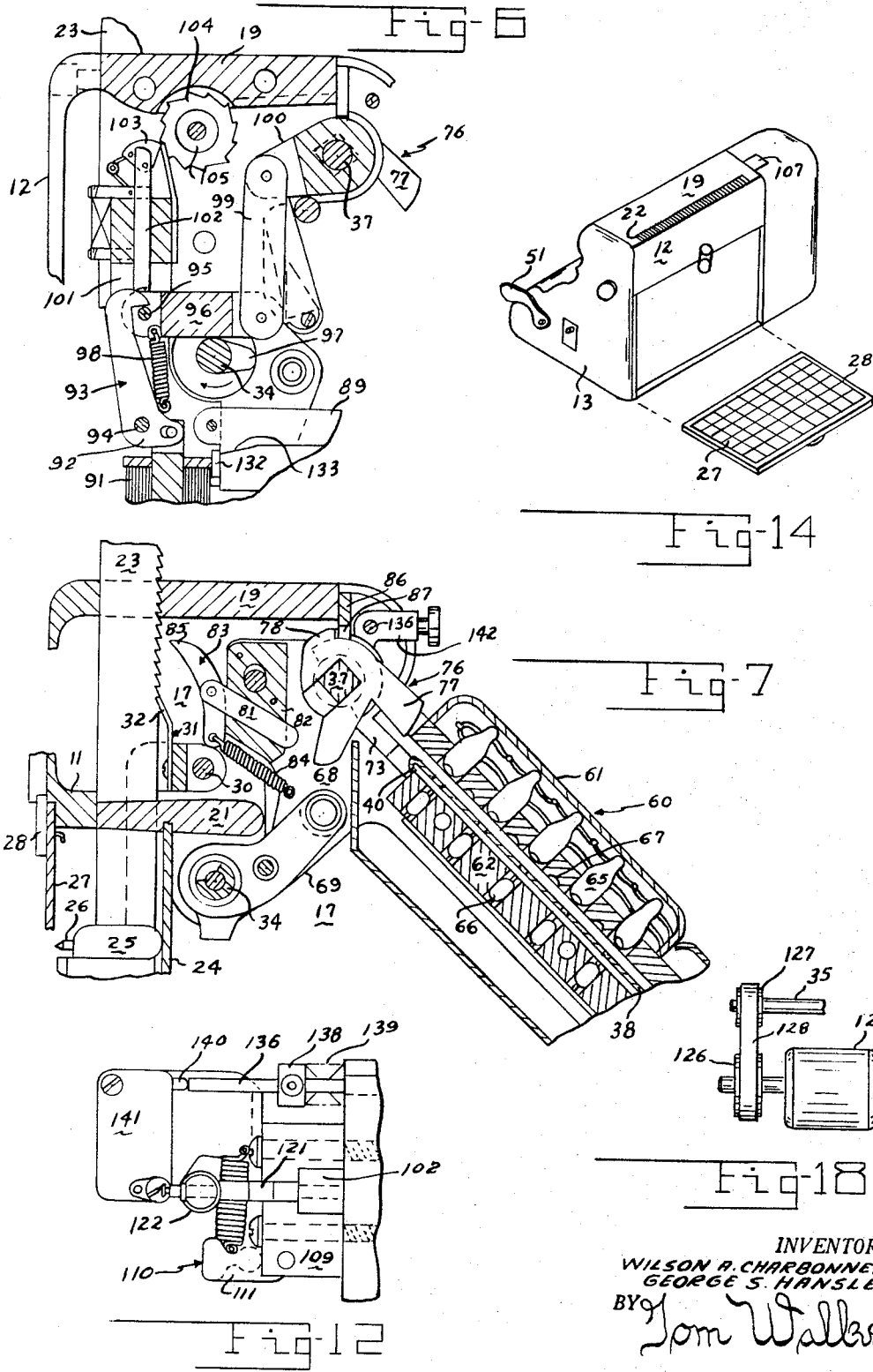

3,346,970
RECORDING APPARATUS
Wilson A. Charbonneaux and George S. Hansley, Dayton, Ohio, assignors to WacLine, Inc., Dayton, Ohio, a corporation of Ohio
Continuation of application Ser. No. 258,986, Feb. 18, 1963. This application May 17, 1965, Ser. No. 464,593
16 Claims. (Cl. 35—48)

This is a continuation of application Ser. No. 258,986, filed Feb. 18, 1963, now abandoned.

This invention relates to a highly versatile recording unit which is low in cost, easy to operate and inexpensive to maintain.

A preferred embodiment has utility in the educational field and the invention will be particularly described in reference thereto. However, it should become obvious to those versed in the art that neither the invention application nor the form of its embodiment need be so limited. Such is not intended.

In the field of education many tests have been developed for students of all levels which involve questions having multiple choice answers. The choice of answers to such questions may be represented by a series of blanks on a standard type punch card or the like. Therefore, each student taking such a test may receive a card having rows of blanks, each row representing a choice of answers to a single question and the number of rows being determined by the number of questions. The student upon determining his answer to a specific question punches a hole in the card in the appropriate row at the location of the appropriate representative blank.

Utilizing this concept, a preferred embodiment of the present invention provides a highly efficient and economical means and method for scoring such tests, recording the results on each individual card and storing elements of information extracted therefrom in summary form. It not only enables a fast accurate study of the achievements of a group of students in respect to each question included in a test, but also provides a visual evaluation of teacher performance.

A primary object of the invention is to provide an improved recorder unit for scanning, evaluation, and utilizing information stored in conventional punch cards or the like which is economical to fabricate, more efficient and satisfactory in use, adaptable to a wide variety of applications and unlikely to malfunction.

Another object of the invention is to provide a portable recorder unit capable of scanning cards or the like having information symbolically represented thereon, extracting information therefrom and signaling the results in individual and summary fashion.

A further object of the invention is to provide a portable recorder unit which can be used for scoring tests the answers to which are represented by perforations in conventional punch cards or the like.

An additional object of the invention is to provide an improved device for comparing cards having information punched thereon and recording similarities and differences in individual and composite fashion.

A further object of the invention is to provide a novel device for scoring tests the answers to which are represented by a perforated card including means for physically scanning the test cards and automatically and selectively marking them as to correct and incorrect results.

Another object is to provide a novel compact unit for evaluating and recording information represented by selective perforations on sheet material or the like.

Another object of the invention is to provide a novel portable scanner unit for conventional punch cards or the like having the capacity to compare information thereon with a master card and indicate the results in a physical and graphic fashion. An additional object is to provide such a unit with means to automatically reject information improperly applied to the cards.

Another object of the invention is to provide a novel recording unit for scanning test results represented by perforations on a punch card or the like, comparing them to expected results, indicating similarities and differences by marking of the card, automatically rejecting results indicated in the alternative and recording selected results in a graphic fashion.

A further object of the invention is to provide a portable device for sensing information recorded on cards or other sheet material in symbolic fashion, marking the cards or other sheet material according to the information sensed and storing elements of information obtained thereby.

A further object of the invention is to provide a portable recorder unit possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a generally schematic perspective view of a physical embodiment of this invention;

FIG. 2 is a view similar to that of FIG. 1 with a front cover portion of the device removed to show some detail;

FIG. 3 is a fragmentary view taken from the back of the device of FIG. 1 with its cover removed;

FIG. 4 is a view on line 4—4 of FIG. 3;

FIG. 5 is a view taken on line 5—5 of FIG. 3;

FIG. 6 is a sectional view taken on line 6—6 of FIG. 3;

FIG. 7 is a fragmentary sectional view on line 7—7 of FIG. 3;

FIG. 8 is a side elevation of the scanning carriage employed in the embodiment illustrated;

FIG. 9 is a detail view of error indicating apparatus as embodied in the device of FIG. 1;

FIG. 10 is a sectional view taken on line 10—10 of FIG. 9;

FIGS. 11, 12 and 13 are further fragmentary views of the invention apparatus;

FIG. 14 is a perspective view of the device of FIG. 1 with a portion of its back cover removed to indicate the graph receptacle embodied therein;

FIG. 15 is a schematic of the control circuit employed in the device of FIG. 1;

FIG. 16 is a view of a master punch card which may be utilized in the devices of FIG. 1 to score tests or the like as contemplated by the invention;

FIG. 17 is a plan view of a punch card including information represented by perforations to be compared to those in the master card of FIG. 15; and FIG. 18 is a schematic view of the power drive for the embodiment of FIG. 1.

Like parts are indicated by similar characters or reference throughout the several views.

The invention embodiment illustrated is housed in a shell 10. The shell 10 includes a rectangular base 11 having a back wall 12 and side walls 13 and 14 perpendicular thereto. A frame partition 15 as fixed intermediately of and parallel to the respective side walls defines a chamber 16 to one side and a chamber 17 to the other.

Fixed between the upper extremities of the side wall 14 and the partition 15 adjacent the back wall 11 is a frame 18.

Frame 18 includes a narrow generally rectangular upper plate segment 19 which abuts the upper edge of back wall 11 and projects generally perpendicular thereto. The plate segment 19 serves to define a top wall section of the shell 10 which covers the rear portion of the chamber 17. The frame 18 also includes a pair of parallel plate segments 20 one of which depends vertically from one extremity of the plate segment 19 to abut the side wall 14 and serve as a medium for fixing the frame thereto. The other plate segment 20 depends from the plate segment 19 in adjacent spaced parallel relation to the partition 15. Plate segments 20 are bridged adjacent but spaced from their dependent extremities by a narrow rectangular plate segment 21 oriented below and parallel to the segment 19 and having one edge in abutment with the back wall 11.

At their edges which abut the back wall 11, the plate segments 19 and 21 include equidistantly spaced, vertically aligned notches 22. Each pair of vertically aligned notches 22 accommodates a bar 23, the back edge of which bears on the wall 11 and a portion on the front edge of which projects to bear on a plate 24 fixed parallel to the back wall below the frame 18 and between the side wall 14 and partition 15. Thus, a series of parallel bars 23 are adapted to move in a sense vertically of the shell 10 adjacent its back wall 11. Fixed to the lower end of each bar 23 is a stylus 25, the marking point 26 of which engages a graph 27. The graph 27 is nested in a removable section 28 of the back wall 11 and is simultaneously engaged by the various marking points 26 which bear thereon for purposes to be further described.

The forwardmost edge of each bar 23 is toothed to form a rack 29. The plate segments 20 of the frame 18 are bridged forwardly of the racks 29 by a shaft 30, the respective extremities of which bear therein. Fixed to a bar mounted longitudinally of the shaft 30 is a blade 31 including equisdistantly spaced relatively projected spring fingers 32. One finger 32 is positioned opposite each of the racks 29 normally biased to curve upwardly and rearwardly of the shaft 30 to engage the under side of a tooth of the opposed rack and thereby prevent movement of the rack inwardly of the shell 10 referenced thereto. Suitable means are connected to apply a bias to the shaft 30 to cause the spring fingers 32 to maintain their engagement with the opposite racks 29. However, a lever 33 fired at one end of the shaft 30 enables a rotation of the shaft against the bias thereon to thereby enable the simultaneous disengagement of the fingers 32 from the racks 29. As this occurs, all of the bars 23 will simultaneously seat to the base of the shell 10.

The side wall 14 and partition 15 are also bridged by a lead screw 34 one end of which bears in the wall 14 and the other end of which includes a shaft-like extension 35 which projects through and bears in the partition 15.

The forwardmost portions of the plate segments 20 include forwardly projected ears 36 positioned immediately below the plate segment 19. The ears 36 bearingly accommodate a shaft 37 which extends therebetween and projects therethrough in a sense parallel to the lead screw 34.

The portion of the shaft 37 intermediate the segments 20 is rectangular in cross-section, the purpose of which shall be further described.

From the plate segment 19, the upper surfaces of the side wall 14 and the partition 15 slope downwardly to a position adjacent and spaced vertically above the front edge of the base of the shell 10 from which point they depend perpendicular thereto. Intermediate the extremities of their relatively sloped surface portions the partition 15 and the side wall 14 include laterally aligned recesses. These recessed portions are bridged by a reference plate 38. One end of the plate 38 is fixed relative the partition 15 and the other end projects outwardly of the side wall 14. Its projected extremity includes a central notch 39.

At its respective vertical extremities, to the underside thereof, the plate 38 includes relatively opposed slide guides 40 which open at its projected extremity to slidably receive a master punch card 41. The master card 41 includes vertical rows of equidistantly spaced blanks 42, each of which is partially cut. As applied for the educational purpose previously described, the blanks in each row represent a choice of answers to a question, the blank representing the proper choice being perforated. The blanks in the respectively adjacent rows are laterally aligned to form parallel rows running longitudinally of the card 41. When card 41 is properly positioned under the plate 38, each of these longitudinally extending rows of blanks is exposed by a slot 43 in the plate 38.

The top of plate 38 is arranged to mount a student card S having blanks 42′ corresponding to and arranged identically as the blanks 42 in the card 41. However, in this case, the student has perforated a blank in each vertical row which represents his choice of answers to the question to which it pertains. The means mounting plate 38 to the partition 15 and side wall 14 include a frame element 44 which projects slightly beyond the partition 15 into chamber 16. The element 44 includes a projected stop 45 adapted to mate with and provide an abutment for a formed corner on the card S to accurately define a position thereof where the blanks 42′ orient over the corresponding blanks 42 of the card 41 thereunder. Card S is fixed in this position by a clamp 46 superposed to the upper edge of the partition 15.

The clamp 46 mounts to one end of an arm 47 intermediately pivoted on one end of a rod 48. A spring 49 applies a bias to the end of arm 47 remote from the clamp 46 to normally displace the clamp relative the plate 38. The rod 48 which bridges the wall 14 and partition 15 immediately below the lower extremity of the plate 38 is arranged parallel to the shaft 37 and the lead screw 34.

Below and parallel to the rod 48 the wall 14 and partition 15 are bridged by a shaft 50. One end of the shaft 50 bears in and projects through the wall 14 to have its projected extremity fixedly mount a lever 51. The other end of the shaft 50 which projects through and bears in the partition 15 fixedly mounts an arm 59 within the chamber 17. Intermediate the side wall 14 and the partition 15 the shaft 50 also mounts cams 53, 54, and 55. These cams respectively control the operating elements of switches 56, 57 and 58 positioned adjacent thereto, the purpose of which shall be further described.

Mounted to bridge the shaft 37 and the rod 48, at right angles thereto, is a scanning carriage 60. The carriage 60 includes a pair of narrow block housings 61 and 62 which are superposed and arranged to respectively opposite sides of the plate 38, at right angles to its slots 43. The blocks 61 and 62 have interconnecting extensions at one end which include means defining a transverse through aperture accommodating the rod 48. The dimension of this through aperture is such to provide a free sliding mount of the lower end of the carriage 60 on the rod 48.

As is readily apparent from the drawings, the blocks 61 and 62 are inclined similarly to the plate 38 and respectively spaced therefrom. The block 61 houses a series of lamps 65, spaced longitudinally thereof, each of which is exposed at its undersurface opposite a slot 43 in the plate 38. The portion of the block 62 thereunder exposes a similarly spaced series of light sensitive cells 66 which mount therein. As a card 41 is positioned to the underside of the plate 38 as previously described, it is oriented between the blocks 61 and 62. At any one scanning position of the carriage 60, a vertical row of blanks 42, one of which is perforated, will respectively align with a lamp 65 and cell 66 through a slot 43. When the card S is properly positioned on the plate 38, the appropriate row of blanks 42′ including one which is perforated will interpose between the blanks of the master card and the lamps 65 in the block 61. Only in the instance the proper hole has been perforated in the card S will the light from a lamp 65 be able to transmit a beam to energize the cell 66 thereunder.

Also included in the block 61, though not shown in detail, are light sensitive cells 67. It is contemplated the surface of card 41 be reflective. As will be described, cells 67 will be energized by light reflected from the card 41 due to an improper perforation of a card S.

The block 62 includes side plates having parallel extensions 68 which project beyond the extremity of the block 61 remote from rod 48. The plate extensions 68 include dependent portions 69 providing transversely aligned apertures accommodating the respective extremities of a tubular nut 70. Intermediate the portions 69 the nut 70 fixedly mounts a collar 71. This collar is normally positioned adjacent the extension plate 68 most remote from the partition 15, held there by a coil spring 72. The coil spring 72 mounts about nut 70 between the collar 71 and the extension 68 most adjacent the partition 15.

As may be particularly seen from FIGS. 3 and 7 of the drawings, the nut 70 is threadedly engaged about the lead screw 34 and provides a bearing support for the carriage 60. As will be described, the nut 70 also serves as the medium for inducing the movement of the carriage 60 the length of the screw 34.

The upper edges of the extensions 68, immediately beyond the projected extremity of block 61, are bridged by the base portion of a slotting die 73 which includes a generally hemi-cylindrical projection 74. The projection 74 overlies the upper portion of shaft 37 as it extends transversely of the carriage 60 and through notches in the upper edges of the plate extensions 68. The die portion 74 includes an arcuate slot 75 which is transversely centered in reference to the lateral extremities of the carriage 60. The slot 75 accommodates a cutter plate 76 having a rectangular recess at its base accommodating the shaft 37 to which it mounts thereby. So mounted the plate 76 may be slid longitudinally of shaft 37 under the influence of the die 73. The cutter unit 76 includes a blade section 77 which projects in the direction of the block 61. The block 61 mounts a projected guide plate 79 which is slotted in the path of the blade 77. It should be noted that the size and extent of the student card S is such that its upper extremity projects upwardly over the base of the die 73 to dispose its upper edge in the path of the blade 77. The upper edge of the card S includes a series of blocks 78, each of which aligns with one of the vertical rows of blanks 42′.

A portion of the plate 76 relatively depends at the side of shaft 37 most adjacent the block 61 and normally positions to the rear of a bar 81 which inclines rearwardly and upwardly therefrom. The bar 81 slidably mounts in block 82 which transversely connects the upper extremities of the plate extensions 68.

Beyond the plate extensions 68, the bar 81 pivotally connects to a pawl 83 intermediate its extremities. Pawl 83, to its lowermost extremity, is biased inwardly of the plates 68 by a spring 84 while its operating extremity 85 is biased thereby to position relatively adjacent a rack 29 of a bar 23 in a scanning position of the carriage 60 to be described.

Fixed to vertically depend at the front edge of the plate-segment 19 of the frame 18, positioned immediately above the plate 76, is a bar 86. Its dependent edge includes equidistantly spaced notches 87 each respectively aligning with a bar 23. On rotation of the shaft 37, the plate 76 rotates therewith. As this occurs, a projection 88 on the plate 76 will engage in a notch 87 as and for purposes to be further described.

As mentioned previously, the shaft 50 mounts an arm 59. The projected extremity of arm 59 pivotally connects to one end of a link 89. The link 89 extends upwardly and rearwardly of the partition 15 to have its other end pivotally connect adjacent the lower extremity of a plate 90.

The plate 90 is pivotally suspended by its upper extremity on a pin 9. The pin 9 anchors perpendicular to the outer side of the partition 15 and the projected extremity of the plate segment 19.

The partition 15 includes a cut out portion adjacent the plate 90. Vertically oriented in this cut out portion, fixed to the lower extremity of the plate 90 at its side adjacent the partition 15, is a solenoid 91. The core of solenoid 91 has a projected extremity which hooks to the short arm 92 of a bell crank lever 93. The lever 93 pivots on a stud 94 fixed perpendicularly to the plate 90.

The solenoid 91 is shown in an energized condition in the FIG. 7 of the drawings. As illustrated, in this condition, the relatively longer arm of the bell crank lever 93 has a hook extremity which engages over a pin 95. The pin 95 bridges the bifurcated extremity of an arm 96, an intermediate portion of which bears on a cam 97 fixed on the extension 35 of the lead screw 34. It is to be noted that a spring 98 extends between the hooked extremity of the arm 96 and the arm 92 of the lever 93 to produce a light bias of the arm 96 in the direction of the solenoid 91. The other extremity of the arm 96 is pivotally connected to a link 99 which in turn is pivotally connected to one end of an arm 100. The opposite end of arm 100 is clamped to a projected extremity of the shaft 37.

The hooked extremity of the arm 96 bears for vertical movement in a bifurcation formed in a frame 101 which is fixed to the plate 90 above the solenoid 91. Frame 101 includes vertically oriented transversely aligned slots which accommodate the projected extremities of the pin 95. Bearing on the extremity of the arm 96 adjacent the pin 95 is the lower end of a push rod 102. The rod 102 projects in a vertical sense through an opening in the frame 101 and bears thereon. The upper extremity of the rod 102 mounts a spring biased pawl 103 positioned in operative relation to a ratchet wheel 104. The wheel 104 is mounted to a stud shaft 105, a bearing for which extends transversely through the plate 90. The shaft 105 extends through the bearing in the plate 90 to fixedly mount a pinion 106 at its end remote from the wheel 104. Pinion 106 is disposed immediately below and forwardly of the pivot pin 9.

In its operative position, the pinion 106 is geared to a rack 107 which bears in a pair of spaced blocks 108 and 109. The blocks 108 and 109 are fixed to the side of the partition 15 in the chamber 16 to orient the rack 107 to operate in a plane parallel to that of the plate 38.

A U-shaped bail 110 has oppositely projected pivots on its leg portions 111 by means of which it eccentrically mounts to and between the blocks 108 and 109. The legs 111 of the bail 110 are oriented to normally project inwardly to the partition 15 to position its bridging portion 112 remote therefrom under the influence of a spring 8. The portion 112 includes a cylindrical projection 113 which slidably nests in the U-shaped projection on the dependent extremity of a cutter 114. The cutter 114 bears in a die 115 fixed to one side of the rack 107 at a portion thereof which positions between the blocks 108 and 109.

When a card S is oriented in its proper position on the plate 38, one extremity projects past the partition 15, as its formed bottom abuts the stop 45. This projecting portion is marked with a series of adjacent blocks 116 successively arranged from top to bottom. The blocks are successively arranged from top to bottom. The blocks are successively numbered beginning with zero. So oriented, this projected edge of the card S is thereby arranged to bear on the upper surface of the die 115 in a direct line with the cutter element 114 which functions in a manner and for purposes to be further described in reference to the card S.

Fixed to the extension 35 of the lead screw 34 is a second cam 117 operating on an arm 118 pivoted to the partitioned 15 adjacent thereto. The arm 118, in turn, is adapted on actuation by the cam 117 to engage a projected extremity of a leg 111 of the bail 110 and eccentrically pivot the bail to thereby vertically depress the cutter 114. Under certain conditions to be described, as the cutter 114 is depressed, it will cut a notch in a block 116 of a card S thereunder. Fixed to the side of the partition 15 in the chamber 16 to underlie the cutter 114 is a chute 119. The chute 119 receives notched out portions of the card S and directs them to a receptacle 120.

An extension of the rack 107 projects beyond the block 109 to mount a pin 121 fixed at right angles to its projected extremity. The pin 121 engages through one end of the tubular rod 122 mounting a piston operating in a tube 123 which provides a dash pot. The tube 123 is anchored by suitable means to orient parallel to the rack 107. Anchored to the frame structure adjacent the tube 123 is one end of a spring 124 the remote end of which connects to the pin 121. As will be seen, the spring 124 tends to normally bias the rack 107 through the medium of the pin 121 to project relative the shell 10 and mount the cutter 114 in a position immediately in advance of the zero block, previously described, of a card S positioned on the plate 38.

Mounted on the base of the shell 10 in the chamber 16 is a motor 125. The drive shaft of motor 125 mounts a pulley 126. A pulley 127 fixed to the projected extremity of the shaft extension 35 of the lead screw 34 is connected to pulley 126 through the medium of a drive belt 128.

It may be seen from FIG. 3 of the drawings that dependent from one of the plate extensions 69 on the carriage 60 is a lobe 129. On movement of the carriage, as will be described, to the extremity of the lead screw 34 adjacent partition 15, the lobe 129 will engage a lever 130, biased thereto by a spring 131. The lever 130 has a projecting portion 132 which engages in advance of a projection 133 on the link 89 to maintain the plate 90 in a position to cause the pinion 106 to engage the rack 107 in a manner to be described. As the lever 130 is engaged by the lobe 129, it is caused to pivot to release the portion 132 from the projection 133 on the link 89. This allows a spring 135 to bias the link to cause plate 90 to pivot and thereby displace pinion 106 from the rack 107.

Bridging portions of the side wall 14 and the partition 15 immediately above and parallel to the shaft 37 is a rod 136 which bears therein. A portion of the rod 136 projects through the partition 15 to the chamber 16 where it fixedly mounts a collar 138. Positioned about the rod 136 between the collar 138 and the partition 15 is a coil spring 139. The spring 139 biases the rod 136 to normally project inwardly of the chamber 16 and engage the control button 140 of a switch 141 which mounts therein. In this normally biased position, the rod 136 thereby effects a closure of the switch 141. The end of the rod 136 adjacent the side wall 14 mounts an adjustably positioned stop 142. This stop 142, as will be described, is adapted to be engaged by the carriage assembly 60 on return movement thereof subsequent to scanning of a card on the plate 38 to displace the rod 136 against the bias thereon and thereby open the switch 141 as and for purposes to be described.

The apparatus as above described constitutes a preferred embodiment of the invention an application of which is specifically illustrated in reference to the field of education. It is utilized as follows:

A master card 41 which includes suitably perforated blanks 42 representing the answers to a series of test questions is slid under the plate 38, contained thereto by the guides 40. As the card 41 is properly positioned by engagement thereof with suitable abutments, the slotted portions 43 of the plate 38 frame the blanks 42 which symbolize the available choice of answers to each question in vertical rows. Each vertical row constitutes a scanning station for the carriage 60 as it will move across the plate 38.

The operator of the invention embodiment will have a series of cards S available each of which represents the answers of a single student to the questions represented on the card 41. A single card S may then be positioned over the plate 38 to have the corresponding blanks 42' thereof directly aligned with the blanks 42 on the card 41 by the abutment of its formed corner with the frame projection 45. A bar 23 then occupies a plane common to each of the scanning stations, the blocks 116 on the edge of the card S beyond the partition 15 are positioned in line with the cutter 114 and the upper edge of the card S projects over the base of die 73 to the depth of blocks 78.

To start the operation of the described unit, as the card S is properly positioned over the plate 38, the lever 51 may be depressed. This rotates the shaft 50 through a small angle causing the arm 59 to pivot forwardly and down whereupon a portion thereof engages the dependent extremity of the arm 47. The engagement of the arm 47 in this manner causes it to pivot against the bias thereon and apply the clamp 46 to fix the position of the card S over the plate 38 and relative the card 41. Simultaneously therewith, the cams 53, 54 and 55 on the shaft 50 are caused to close the switches 56, 57 and 58 to energize the motor 125.

As the motor is energized, the lead screw 34 is caused to rotate in place. The nut 70, which is fixed against rotatory movement relative the plate extensions 68 on the carriage 60 is thereby caused to move longitudinally of the lead screw. The collar 71 thereon applies a bias through the spring 72 which is transmitted through the plate extension 68 which it abuts to cause the carriage 60 to move over the plate 38 in a manner believed obvious.

At the time the arm 59 was rotated by the shaft 50 to close the clamp 47 on the card S, it also pulled the link 89 forwardly, against the bias of spring 135, to dispose the plate 90 in a position where the pinion 106 gears to the rack 107. In the process of its forward movement, the projection 133 on the link 89 cams over the portion 132 of the lever 130. As the projection 133 passes the portion 132, the portion 132 is biased in the path thereof to prevent the link 89 from being displaced from its then achieved position.

At this point, the lead screw 34 is operatively related through the medium of cams 97 and 117 for the selective control of cutters 76 and 114 in a manner as will soon become apparent.

As the motor 125 commences to operate, the rack 107 is fully projected from the shell 10 under the influence of the spring 124. Also, at this time, all the bars 23 are housed in the shell 10 seating to its base 11 to dispose the marking points 126 at spaced positions along the bottom of the graph 27.

As the carriage 60 is driven across the face of the plate 38 by rotation of screw 34, it carries the cutter 76 therewith due to the confinement thereof to the shaft 37 and within the slot 75 of the die 73.

The carriage is moved to dispose its lamps 65 and cells 66 in line with the first scanning station defined by a vertical row of blanks on the cards 41 and S. In the case where the superposed cards have the same perforation at this first station, the lamp 65 in line therewith will project a beam therethrough to energize the opposite cell 66. The cell 66 signals a correct answer and closes a circuit to energize the solenoid 91. As this occurs, the solenoid core pulls down the arm 92 of the bell crank lever 93 to cause the hook extremity of the lever 93 to engage over and anchor the adjacent pin 95. At the same time, the cam 97 on the feed screw 34 arrives at a position where it rocks the arm 96 about the pin 95 as a pivot. This rocking motion causes the link 99 to move the arm 100 and rotate the shaft 37 in a direction forwardly of the shell 10. The turning of the shaft 37 causes the cutter unit 76 to turn therewith and have its blade element 77 move downwardly through the slot 75 to notch the adjacent blank 78 in the upper edge of the card S on a line with the station being scanned. This notch indicates a correct answer at that station. Then the cam 117 moves the arm 118 to pivot the bail 110. The pivoting of the bail 110 causes the cutter 114 to press inwardly of the plane of the card S. However, since the rack 107 was not moved to indicate an incorrect answer at the station being scanned, at this point, the cutter 114 does not engage the card.

As the cutter unit 76 rotates to notch a correct answer at the station being scanned, a dependent portion thereof cams the bar 81 to cause the pawl 83 to engage a tooth of the opposite rack 29 to lift the appropriate bar 23 one notch. The marking point 26 of the stylus connected to this bar 23 advances one increment on the graph 27, on a line corresponding to the station in question. The bar 23 is prevented from slipping back by a spring finger 32 in a manner believed obvious from FIG. 7 of the drawings.

A feature of the invention apparatus is that as the cutter element 76 moves forward to effect a notch of a block 78 on upper edge of the card S, the projection 88 thereof engages in a notch 87 in the bar 86 to assure an accurate position of the pawl 83 as it is moved to engage and advance the bar 23 corresponding to the station being scanned.

The lead screw 34 continues to rotate in spite of the momentary holding of the carriage 60 from advance as the projection 88 engages in a notch in the bar 86. During this moment, the nut 70 advances its collar against the spring 72 and stores energy therein. Also the cam 97 is turned to permit the lowering of arm 96 under the influence of a spring 145. This causes displacement of the projection 88 from the notch 87 whereupon the energy stored in spring 72 is released to rapidly advance the carriage to the next scanning station.

If in similarly scanning the next row of blanks on the superposed cards, the scanner 60 finds the student has punched an incorrect answer, the lamps 65 cannot energize any one of the cells 66. Once again, however, the cam 97 is timed to bias the arm 96 upwardly during the instant of scanning. However, in this instance, the solenoid 91 is not energized due to the fact that none of the cells 66 sense light. The relative bias applied to the opposite ends of arm 96 at this point, by springs 98 and 145, is such that the end mounting the pin 95 will be cammed upwardly to cause the pawl 103 on the rod 102 to engage and rotate the wheel 104 one increment. The turning of the wheel 104 causes a rotation of the pinion 106 to advance the rack 107 inwardly one increment. This disposes the cutter 114 over the zero block 116 on the projected edge of the card S. As this occurs, the cam 117 once more pivots the arm 118 to eccentrically pivot the bail 110 and depress the cutter 114 to cause a notch of the zero block of the card S. The next block 116, which is marked 1, will indicate the number of errors recorded at this point. Since there was an incorrect answer, the cutter unit 76 will not be activated, nor will the bar 23 at this station which revealed an incorrect answer.

In the notching process, the notched portion of the card is caused to drop to the tray 118 which delivers it to the rubbish receptacle 119.

If per chance, an indecisive student has punched both the correct and an incorrect blank of a card S, upon scanning, one lamp 65 will excite a cell 66. However, the improper perforation in the card S will reveal a reflective surface of the card 41. The opposite lamp 65 will cause a beam of light to be applied to this surface which will be reflected to excite an adjacent cell 67. If desired, the solenoid 91 may include, in addition to the normal winding, and extra bucking winding. The exciting of the cell 67 will then cause a current through the bucking winding which nullifies the signal of the sensing cell 66. Of course, in this event, the results are the same as if an incorrect answer has been punched. In the absence of energizing the solenoid 91, as previously described, the rack 107 is caused to move inwardly along the side of the card S and the cutter 114 is moved to notch a block 116.

Thus, it may be seen that as the carriage 60 is caused to move a cross the plate 38, at each station the answers on the master card and the student card will be compared by a sensing operation. As a result and at the time of sensing, either the top edge of the card at each station will be notched to indicate a correct answer or the side edge will be notched to indicate an incorrect answer. In the event of correct answers, in the example illustrated, this information is stored by the bars 23 and marked on the graph 27.

When the carriage 60 reaches the end of its travel over the plate 38, the lobe 129 thereon engages lever 130 to cam its portion 132 from the path of the projection 133 on the link 89. As this occurs, the spring 135 biases the link 89 to pivot the plate 90 and thereby displace the pinion 106 from the rack 107. As the rack 107 is relieved from engagement by the pinion, the spring 124 will cause it to project from the shell 10 once more, its movement being damped by the dash pot arrangement provided in the tube 123. This return of the rack 107 disposes the cutter 114 in a position where it will orient in advance of the zero box on the upper projected extremity of the next card S positioned on the plate 38.

As the plate 90 pivots under the influence of the released link 89, the arm 59 is also disengaged from the arm 47 to permit the clamp on the card S to be released. Also, the movement of the link 89 causes rotation of shaft 50 and the cams thereon whereupon the switches 56, 57 and 58 move to a motor reverse position. The switches 56 and 57 will then operate to reverse the motor 125. This causes the lead screw to turn in the opposite direction and return the carriage 60 to its original position. The switch 58, in this position, shuts off power to a transformer 146 in the control circuit which in turn prevents operation of the lamps 65 and the cells 66 as well as the solenoid 91 during reverse travel of the carriage, in a manner believed obvious.

As the motor is running in reverse (and only then), current flows through the switches 56 and 57 from one side of the line to the motor, and a portion charges a timing capacitor 147 to a direct current potential nearly equal to the line voltage peak by the action of a rectifier 148 connected to the other side of the supply line through a limiting resistor 149. A rectifier 150 is connected across the coil of a relay 151 in the conducting direction to pass the charging current past the high resistance of the relay coil and thereby reduce the charging time. The limiting resistor 149 prevents the destruction of the rectifiers 148 and 150 by too high currents.

When the carriage 60 returns to its starting point, a portion thereof strikes the stop 142 to pull rod 136 from switch 141. This causes an interruption of supply to the motor 125. Also it discharges the capacitor 147 through the coil of relay 151 which closes for a short time, determined by the amount of energy stored and the resistance of the relay coil.

With closing of relay 151, the motor brushes are shorted, causing the motor to act as an overloaded generator. Also A.C. current is supplied to the field coils, which keeps an induced current flowing in the rotor windings. The motor 125 stops almost instantly to prevent coasting. When the charge in capacitor 147 is depleted, the circuit is in condition to start the next scanning cycle.

It is to be noted that an adjustable resistor 152 is included in the circuit in series with the motor to lower its speed during scanning but is out of the circuit during a reverse operation.

Also included in the circuit is a manually operable toggle switch 153 with a double pole, double throw function and a centering off position. This switch may be activated in one direction to momentarily jog the carriage forward from the limit stop 142 to permit the stop to be set in a new position to change the number of stations that can be scanned. Throwing the switch 153 oppositely will cause the carriage to hit the stop 142 and stop motor 125 once more preparatory to a new scanning sequence.

A card S may obviously be removed at any time after scanning is completed and a new one put in its place. Though rack 107 repositions for each card scanned, bars 23 do not. However, as the scanning of all cards is completed, lever 33 is tripped to release all bars 23 to seat to the base 11.

Thus, the embodiment of the invention as illustrated provides a compact and highly simplified recording unit which is extremely versatile in application. While a particular application of the invention has been referred to by way of example this is intended in no way to be limiting.

Basically the invention provides a desk top unit which can scan and sense and/or compare information symbolically portrayed on sheet metal. Means are included to selectively transmit signals of such information and utilize it in a number of ways described and others believed obvious. As described, the scanning procedure can automatically result in a physical marking to portray the information scanned in a simple code form, a mechanical storage of information, a graphic portrayal of information scanned, or any one or combination thereof.

The invention may be utilized as described or modified in an obvious manner to extract, store and utilize information of any nature capable of being stored in code form on sheet material. In some instances, as in the example illustrated, the invention embodiments may be used to facilitate a coded comparison of selected facts and to produce a conclusion therefrom. However, in other instances, the unit per se may be just as easily used to store selected information in a categorical fashion having been previously conditioned to recognize certain categories in an obvious manner.

For the record, this application is a continuation of applicants' pending application Ser. No. 258,986, filed Feb. 18, 1963 for Recording Apparatus.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises but one of several modes of putting the invention into effect, and the invention is therefore claimed in any of its forms or modifications within the legitimate and valid scope of the appended claims.

Having thus described our invention, we claim:

1. A unit for scoring tests involving a series of questions the proposed answers to which are represented by perforations on punched cards or the like including a housing having means for comparing each answer on a card to a representation of the correct answer stored in said housing characterized by a scanner, means for moving the scanner from answer to answer to sense the correctness or incorrectness of the answer by comparison thereof with a representation of the correct answer, means in said scanner operative to transmit a signal of the sensing of a correct answer, means in operative connection to said scanner moving means and moving with said scanner to respond to said signal to notch the card accordingly, other means controlled by said scanner independently of the first mentioned notching means and operating on observation of an incorrect answer to notch the card accordingly and means in said scanner operative to induce operation of said second mentioned notching means on observation thereby of multiple perforations indicating an answer recorded in an alternative form.

2. Scanning and recording apparatus comprising a housing having a removable back plate including means thereon defining a graph surface to its inner side, a series of marking elements movable adjacent said back plate to bear on said graph surface, means in said housing establishing a straight line path of movement for said marking elements, means interengaging with said marking elements to fix each of said elements in a selected position of adjustment in reference to said graph surface, means defining a reference platform in said housing for releasably mounting a master card including at spaced stations thereon symbolic representations of information, means to fix in stacked relation to said master card sheet material having at spaced stations thereon corresponding to the stations on the master card symbolic representations of recorded information, means on said housing operable to traverse and scan said sheet material at each of the spaced stations thereon and to compare the information on the sheet material with respect to the corresponding information on the master card, means in said housing cooperating with said scanning means to be energized thereby on the scanning means observing corresponding symbolic representations on said master card and said sheet material to mark said sheet material in reference to the station scanned, means responsive to the observing of the corresponding symbolic representations to adjust one of said marking elements to produce a corresponding mark on said graph, means in said housing operating to temporarily restrain the movement of said scanning means during the marking of the graph, means to one end of said reference platform including a base for a portion of said sheet material, said last named means mounting a movable cutter and means related to said scanning means operative to adjust said cutter to notch the sheet of material corresponding to a station scanned when a symbolic representation on said sheet material at that station is not matched by a similar representation on the master card.

3. Scanning and recording apparatus as set forth in claim 2 characterized by a lead screw rotatable in said housing and operative to cause the movement of said scanning means from station to station, said lead screw having in connection therewith means which are selectively operative to produce the aforementioned marking of said sheet material and said graph in respect to each of the stations scanned.

4. Apparatus for scanning punch cards or similar devices having elements of information symbolically represented thereon at a plurality of defined stations comprising, a housing, means defining a reference frame in said housing to position cards to be scanned in stacked relation to a master card, a scanner unit on said housing, said scanner unit including a plurality of sensing elements which selectively respond to a comparison of information at a particular station scanned, a drive rod extending through a portion of said housing, means mounting said scanner unit to said drive rod for movement longitudinally thereof and relative said reference frame to individually scan each station of a card thereon, a plurality of can means in direct connection with said drive rod, a device in said housing to mark a predetermined portion of the scanned card to indicate a particular class of information recognized by said sensing elements on scanning the information at each of the defined stations, a further device in said housing for marking another portion of the card to indicate the recognition of another class of information by said sensing elements at each of said stations and means respectively relating said cam means and said devices rendered selectively operable by said sensing elements during scanning of a station to selectively energize said devices to appropriately mark the information recognized in respect to the particular station scanned.

5. The structure as set forth in claim 4 and means operatively connected with one of said marking devices operable simultaneously therewith to produce a visible graph of the marked information.

6. Scanning and recording apparatus comprising a housing having a back plate, a graph provided on the inner surface of said back plate, a series of generally vertical parallel bars movable adjacent said back plate, each bar having, in connection therewith, a marking element bearing continuously on said graph, guide means in said housing providing for a straight line path of movement for each of said bars, a shaft rotatable in said housing, means on said shaft and said bars interengaging to normally fix each bar in a selected position of adjustment, means for rotating said shaft to simultaneously release said bars for mutual return to a reference position within said housing, a reference platform on said housing having means to releasably mount thereon a master card including symbolic representations of information, said reference platform also providing means to mount in stacked relation to said master card a sheet of material having recorded thereon symbolic representations of information, means traversing said housing in adjacent relation to said sheet material to move from representation to representation in respectively independent scanning relation thereto, means in said housing energized by said scanning means on the latter observing a super position of corresponding symbolic representations to transmit an indication thereof and means directly responsive to such transmission to vertically adjust a selective one of said bars and produce thereby a marking of the transmitted information on said graph.

7. A recording unit including, means for sensing information symbolically represented in successive record positions on a card or like material in reference to expected information, means for inducing a relative movement of said sensing means with respect to said card whereby said sensing means may position at each record position and transmit a signal in reference to the information there sensed and a plurality of marking elements operatively related to and independently and selectively responsive to said sensing means to selectively move relative said card and automatically mark the card per se at the time of sensing each record position and before progressing to the next successive record position to selectively record at such time a correspondence or a lack of correspondence with said expected information.

8. A recording unit including means for sensing information symbolically represented in successive record positions on a card or the like in reference to expected information, means relatively moving the sensing means and card for individual sensing of each successive record position, a plurality of marking means selectively responding to said sensing means to move relative the card to selectively and automatically mark the card per se at the time of sensing each record position and before progressing to the next succeeding record position to selectively record correspondence or lack of correspondence with said expected information, and means in said sensing means rendered operative to nullify a recording of correspondence and induce a recording of lack of correspondence in reference to information represented on said cards in an indefinite manner.

9. A recording unit including, means for sensing information symbolically represented in successive record positions on a card or the like in reference to expected information, means relatively moving the sensing means and card for individual sensing of each successive record position, a plurality of marking means operatively responsive to said sensing means to move relative the card to selectively and automatically mark said card to selectively record thereon correspondence or lack of correspondence with said expected information at the time of sensing each record position, said unit having a housing incorporating means other than said card providing a graph surface and having means therein connected to respond to selected results of the sensing procedure at the time each sensing linearly to record said results on said graph at the time of sensing.

10. A portable scanner unit for conventional punch cards or the like including means for comparing information in successive record positions on a card with information recorded on a master card, means for relatively moving the comparing means in respect to the card for sensing thereby each individual successive record position, a plurality of independent cutting elements selectively operating in response to a comparison in each record position to mutilate said card at the time of comparison and before progressing to the next succeeding record position, and means operatively connected to said comparing means rendered operative in response to a predetermined mutilation of the punch card to produce an incremental linear graphic reproduction of the information indicated thereby.

11. Apparatus for scanning punch cards or similar devices having elements of information symbolically represented thereon at a plurality of defined stations comprising, a housing, means defining a reference frame in said housing to a position cards to be scanned in stacked relation to a master card, a scanner unit on said housing, said scanner unit including a plurality of sensing elements which selectively respond to a comparison of information at a particular station scanned, means mounting said scanner unit for movement relative said reference frame to individually scan successive stations of a card thereon, a device in said housing operable at each station and before said scanner unit moves to a next succeeding station to mutilate a predetermined portion of the scanned card to indicate a particular class of information recognized by said sensing elements on scanning the information at each of the defined stations, at least a further device in said housing for mutilating another portion of the card to indicate the recognition of another class of information by said sensing elements at each of said stations and means rendered selectively operable by said sensing elements during scanning of a station to selectively energize said devices to appropriately indicate the information recognized in respect to the particular stations scanned.

12. A device for scanning information symbolically portrayed at a plurality of defined stations on punch cards or the like comprising, a housing, movable information storage elements in said housing, one for each station which can possibly be scanned on said cards, means for positioning said cards in said housing, a scanner unit mounting on said housing having means in connection therewith for movement thereof to individually scan each of the stations on each card and selectively identify the information scanned, means connected in said housing to respond to the identification of certain information scanned at a particular station to selectively transmit a signal thereof to one of said storage elements for incremental movement thereof, and means in connection with said one storage element substantially simultaneously reproducing a graphic picture of the information represented by the transmitted signal, said one storage element having means in connection therewith rendering it operative to graphically summarize a plurality of similar transmitted signals respectively deriving from different cards and substantially simultaneous with the scanning of the cards at the same particular station.

13. A device for comparing information symbolically represented on punch cards or the like at a plurality of defined stations, including means for scanning each of said stations and providing a substantially immediate relay of a selective signal indicating correspondence or lack of correspondence of the information compared, means for inducing a relative movement of said scanning means in respect to said stations to produce the selective signal at each of said stations, a first cutting means connected to move with said scanning means along one portion of a card rendered operative by one class of signal to mutilate the card accordingly at the stations scanned simultaneous with the transmission of said signal and a second mutilating means operatively connected to said scanning means movable along another portion of the card and rendered operative to move in direct and immediate response to a second class of signal to mutilate that portion of the card accordingly simultaneous with the transmission of this signal, the mutilation of the card providing a means facilitating an accurate summary of the results of the scanning procedure.

14. Scanning and recording apparatus comprising means for mounting sheet material having recorded thereon, at selected stations, symbolic representations of information and comparing it with information anticipated to exist at such stations characterized by sensing means operable to move adjacent and to traverse such sheet material, means for inducing a relative movement of said sensing means in respect to said sheet material from station to station, said sensing means having means in operative connection therewith to selectively effect a physical modification of the sheet material which is directly related to the information sensed at each station and substantially simultaneous with the sensing thereof, means defining a graph surface in said apparatus and means inter-related with said sensing means operative substantially simultaneously therewith to mark on said graph surface results of the sensing procedure corresponding to the information sensed and means for inhibiting further operation of said sensing means until completion of the marking procedure.

15. A unit for scoring tests involving a series of questions the proposed answers to which are represented on record cards or the like in successive record positions, including means for sensing successive record positions for answers, a series of parallel bar elements, one for each record position, providing individual recording means operatively related to each record position and connected to have an increment of motion in direct response to the sensing of a correct answer at the related record position which motion is continuing through a run of cards, a stylus on each of said recording means, and graph means on which said stylus bears, said recording means moving vertically of said graph to produce a linear graphic comparison of the number of correct answers in each record position in said run of cards.

16. A unit for scoring tests involving a series of questions the proposed answers to which are represented on a document having marginal portions substantially at right angles to one another, including means for holding said document for sensing of successive record positions thereon, scanner means traversing a held document and sensing successive record positions for correct answers, record controlled means responsive to the sensing of a correct answer in each record position to mark the document in one marginal portion at such record position, and other record controlled means responsive to sensing of an incorrect answer in each record position to mark the other marginal portion of the document in successive marking positions thereon.

References Cited

UNITED STATES PATENTS

| | | | |
|---|---|---|---|
| Re. 20,463 | 8/1937 | Sveda et al. | 35—48 |
| 2,052,442 | 8/1936 | Black | 35—48 |
| 2,102,577 | 12/1937 | Cleven | 35—48 |
| 2,150,256 | 3/1939 | Warren | 35—48 |
| 2,174,702 | 10/1939 | Lake | 234—34 |
| 2,310,437 | 2/1943 | Johnson | 35—48 X |
| 2,353,061 | 7/1944 | Oldenboom | 35—48 X |
| 2,944,734 | 7/1960 | Martin | 235—61.7 |
| 2,968,793 | 1/1961 | Bellamy | 346—34 |
| 3,176,414 | 4/1965 | Leathers | 35—48 |

EUGENE R. CAPOZIO, *Primary Examiner.*

S. M. BENDER, W. W. NIELSEN, *Assistant Examiners.*